US007720145B2

(12) United States Patent
Muthukrishnan et al.

(10) Patent No.: US 7,720,145 B2
(45) Date of Patent: May 18, 2010

(54) MODEL BASED BIT RATE CONTROL FOR A MACROBLOCK ENCODER

(75) Inventors: Murali Babu Muthukrishnan, Bangalore (IN); Arvind Raman, Karnataka (IN); Bhavani Gopalakrishna Rao, Bangalore (IN); Sankaranarayanan Parameswaran, Bangalore (IN); Sriram Sethuraman, Bangalore (IN); Dileep Kumar Tamia, Bangalore (IN)

(73) Assignee: Ittiam Systems (P) Ltd., Bangalore, Karnataka (IN)

( * ) Notice: Subject to any disclaimer, the term of this patent is extended or adjusted under 35 U.S.C. 154(b) by 1383 days.

(21) Appl. No.: 11/122,928

(22) Filed: May 5, 2005

(65) Prior Publication Data

US 2005/0254578 A1    Nov. 17, 2005

Related U.S. Application Data

(60) Provisional application No. 60/570,774, filed on May 13, 2004.

(51) Int. Cl.
*H04N 7/12* (2006.01)

(52) U.S. Cl. ............ 375/240.03; 375/240; 375/240.01; 375/240.12

(58) Field of Classification Search ............... 375/240, 375/240.01, 240.06, 240.12, 240.14, 240.16, 375/241, 240.02, 240.03

See application file for complete search history.

(56) References Cited

U.S. PATENT DOCUMENTS

| 5,764,698 | A | * | 6/1998 | Sudharsanan et al. | 375/241 |
| 5,969,764 | A | * | 10/1999 | Sun et al. | 375/240.06 |
| 5,986,712 | A | * | 11/1999 | Peterson et al. | 375/240.14 |
| 6,434,196 | B1 | * | 8/2002 | Sethuraman et al. | 375/240.12 |

* cited by examiner

*Primary Examiner*—Allen Wong
(74) *Attorney, Agent, or Firm*—Prakash Nama; Global IP Services, PLLC

(57) ABSTRACT

A method for achieving bit rate controlled encoding, e.g., constant bit rate, uses a bit rate control model based on bits allocated per macroblock and based on error in estimating bits consumed in an encoding process in a macroblock. The method computes bits consumed per macroblock as a function of the formed bit rate control model, and allocates bits for the macroblock. To this end, a quadratic (second order) equation is used for the model, which equation might default into a first order equation requiring fewer computations, in the event that no second order solutions exist. In one form, the bit rate control model computes the bit rate to satisfy video buffer verifier (VBV) compliance in accordance with MPEG requirements. The bit rate control model makes allowances for the type of macroblock, i.e., inter, intra or bidirectional, and provides for any frame-skips.

19 Claims, 3 Drawing Sheets

MODEL BASED BIT RATE CONTROL FOR A MACROBLOCK ENCODER

RELATED APPLICATIONS

Benefit is claimed under 35 U.S.C. 119(e) to U.S. Provisional Application Ser. No. 60/570,774, entitled "A model-based constant bit-rate control strategy for a macroblock pipelined encoder" by Murali Babu Muthukrishnan et al., filed May 13, 2004, which is herein incorporated in its entirety by reference for all purposes.

FIELD OF THE INVENTION

This invention generally relates to bit rate allocation in encoders, and more particularly to model based bit rate allocation in encoders for video compression.

BACKGROUND OF THE INVENTION

Motion estimation is an indispensable tool in processing video information, wherein frames of information are encoded for processing. A typical encoder may read a video frame from memory, and generate and send an encoded bit stream back to memory for processing. Typically, an encoder core comprises several pipelined components that process macroblock sized chunks of data. When encoding video sequences as per MPEG (motion pictures experts group) standards, the number of bits required varies from frame to frame, depending on the type of macroblock/frame, i.e., inter (P), intra (I) or bidirectional (B). For transporting the information over a channel (which might have a constant bandwidth), one can send a constant number of bits per time period. There is therefore a need for a regulating mechanism that controls bit rate allocation, or otherwise decreases the number of bits for frames with high information content and increases it in other frames to achieve the best possible quality. From another angle, encoders need to keep track of the bit consumption for the encoded macroblocks or units to ensure proper regulation.

SUMMARY OF THE INVENTION

One embodiment of the invention resides in a method for achieving bit rate controlled encoding, comprising: forming a bit rate control model based on bits allocated per macroblock and based on error in estimating bits consumed in an encoding process in a macroblock; computing bits consumed per macroblock as a function of the formed bit rate control model; and, allocating bits for the macroblock.

A second embodiment resides in a method for achieving constant bit rate encoding for motion compression, comprising the steps of: forming a bit rate control model which estimates an encoding parameter such that a current macroblock to be encoded takes a predetermined number of bits; and, allotting bits for the macroblock to be coded, using said bit rate control model. Also taught herein is an article comprising a storage medium having instructions thereon which when executed by a computing platform result in execution of the bit rate control methods described herein.

The bit rate control model preferably uses a second order (quadratic) equation which might degenerate into a linear first order equation requiring fewer computations, in the event that no second order solutions exist. In one form, the bit rate control model computes the bit rate to satisfy video buffer verifier (VBV) compliance in accordance with MPEG requirements. The bit rate control model makes allowances for the type of macroblock as relating to inter (P frame), intra (I frame) or bidirectional (B frame), and provides for any frame-skips. The rate control model estimates an encoding parameter which might include a quantizer scale and an allowed bit rate. In a variation, the allocation of bits per macroblock may be done for a group of pictures (GOP). In another variation, the computation of available bits per frame is based on bits per second desired by a user, and a ratio of I pictures to P pictures and a factor by which bit allocation for the I pictures is higher than for the P pictures. Other variations and features will be apparent from the detailed description of the invention that follows.

BRIEF DESCRIPTION OF THE DRAWING

A more detailed understanding of the invention may be had from the following description of exemplary embodiments, to be understood in conjunction with the accompanying drawing wherein.

DETAILED DESCRIPTION

In the following detailed description of the various embodiments of the invention, reference is made to the accompanying drawings that form a part hereof, and in which are shown by way of illustration specific embodiments in which the invention may be practiced. These embodiments are described in sufficient detail to enable those skilled in the art to practice the invention, and it is to be understood that other embodiments may be utilized and that changes may be made without departing from the scope of the present invention. The detailed description that follows is therefore not to be taken in a limiting sense, and the scope of the present invention is defined only by the appended claims and their equivalents.

Figure 1:
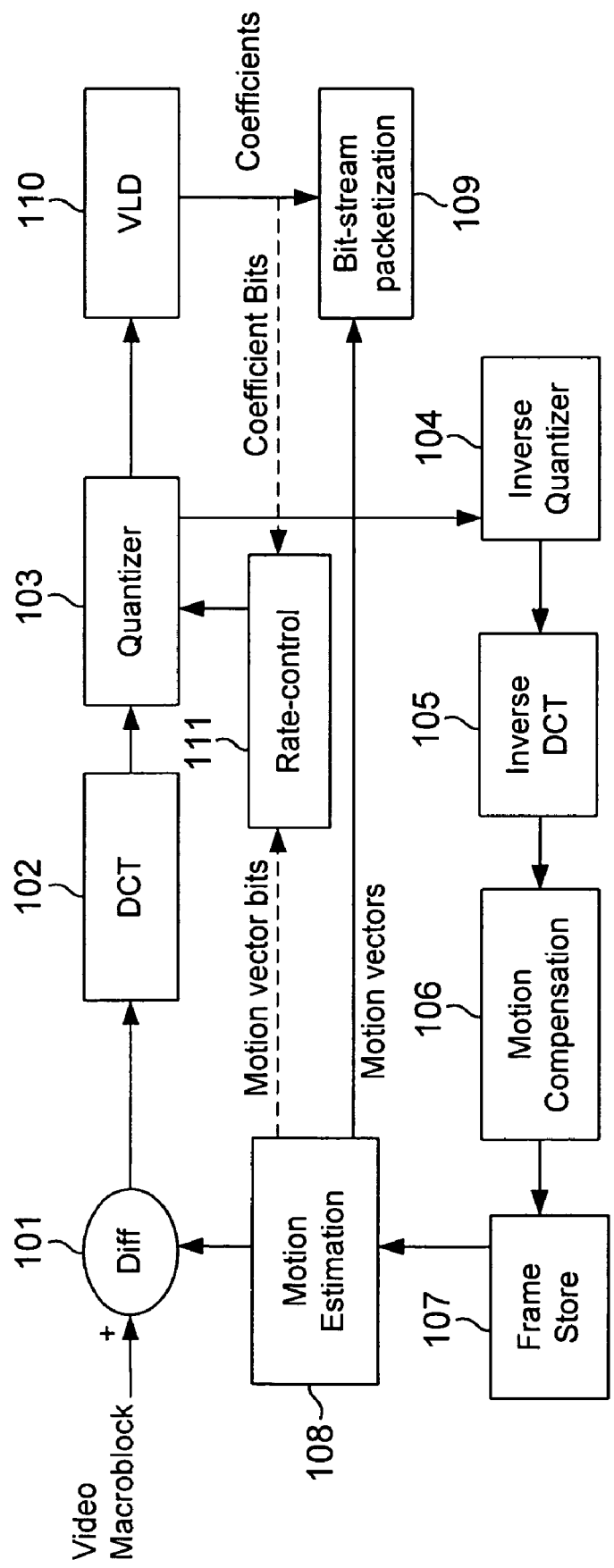
FIG. 1 is an illustration of block diagram of a typical video encoder.

FIG. 1 shows a block diagram of a typical video encoder that receives video macroblock input which is handled by the discrete cosine transform (DCT) unit 102 and sent to the quantizer 103. The output of the quantizer is sent to variable length decoder (VLD) 110 and then sent to the bit stream packetization unit 109 to provide an output of bits. The output from quantizer 103 is provided to a feedback loop comprising an inverse quantizer 104, inverse DCT 105, and motion compensation unit 106 to motion estimation 108 via a frame store 107. Outputs from the motion estimation unit 108 are made available to rate control unit 111 and, as a motion vector input, to the bit stream packetization unit 109. Further details of operation of the encoder and the interaction of the encoder in the overall system are well known to those skilled in the art.

Described hereinafter is a bit rate constrained encoder that tracks the bit consumption for every encoded unit (macroblock) to maintain a constant bit-rate. The encoder uses a model, which fairly accurately estimates the encoding parameters, such as the quantizer scale, whereby the current macroblock to be encoded takes a pre-determined number of bits. The invention teaches the use of a second order model which addresses the quantizer required to achieve the specified bits as a function of the encoding complexity, and the bits allocated for the macroblock using the least squares estimate. The model is expediently constrained in such a way that the computations are fewer and such that the model defaults to a linear model in cases where there exist no second order solutions, without requiring computation of any extra metrics. The model taught herein is further able to follow the restrictions that are placed in the standard MPEG-4 and also to maintain VBV compliance. The model also has the ability to minimize variations in the quantizer and thereby reduce variations in visual quality of encoding. The model has also the capability to ensure that the tracking of bits with the video content is made with the smallest possible delay.

The features provided by the embodiment taught herein include the following:

1. Second order model defaulting to a first order linear model without any extra metric computation.

2. Model conforms to the conditions enforced in MPEG-4, so that it produces valid quant scales.

3. Model provides the VBV (Video Buffer Verifier) compliance.

4. Model is fine-tunable to produce fewer quantizer variations in a frame. This ensures lesser bits as well as uniform picture quality.

5. The model provides for frame skips and dynamically changes the encoding parameters based on the number of frames skipped to ensure that the model is valid even if the scene change is very prominent.

6. The model is configurable to produce a constant bit-rate while maintaining the encoded video quality or the frame rate.

7. Different models for Intra and Inter MBs are possible for tracking the variations better.

The bit rate control algorithm is the heart of the encoder and has the function of maintaining the bit rate as well as, most importantly, the Video Buffer Verifier (VBV) compliance. The VBV compliance ensures that any decoder conforming to the standard will be able to decode the streams produced by the said encoder. The rate control algorithm is also responsible for providing a good quality video stream for a given bit rate. Also it ensures that the video quality of each of the frames is nearly constant or as per the user-specified quality levels. The proposed rate control algorithm is a novel approach that adapts after every macroblock (MB), thus enabling the rate control algorithm to allocate the right number of bits for every MB. The rate control algorithm also ensures that there are generally no frame skips; however, where there are frame skips, the model ensures that the frame skips do not happen in a bunch at any point in the stream.

In the rate control algorithm taught herein, a second order (quadratic) model is developed and forms the core of the rate control strategy. This second order model may default to a first order model under conditions explained herein. The second order model in one form is built as a function of the quantizer scale, and an allowed bit rate (and hence the bits per frame or bits per macroblock). As the quantizer scale is increased in the encoder, the quantization steps become coarser and hence it results in a smaller number of bits for coding the signal. However, as the quantizer value is lowered, it consumes more bits for coding the signal. Also, the number of bits consumed per frame or per macroblock will increase with the energy of the signal. The signal energy for predictive coded pictures like P and B frames is derived to be the estimation error in the motion estimation phase, namely the sum of absolute differences for a macroblock between the pixels in the macroblock to be encoded and the macroblock that has been found to have a good match in the reference frame. In the case of intra coded pictures (I pictures) the signal energy is assumed to be the sum of all the pixel values in the macroblock to be encoded. This property is used in arriving one version of a second order rate control model described herein.

An exemplary second order equation is given below:

Let the number of bits consumed for an $i^{th}$ macroblock be modeled as $$B_i = a*S_i/Q_i + b*S_i/Q_i^2 \quad (1)$$

Let $R_i$ be the number of bits consumed for this macroblock, the error in estimation is determined by $$J(Q_i, S_i, a \text{ and } b) = R_i - B_i \quad (2)$$

$$J(Q_i, S_i, a \text{ and } b) = R_i - a*S_i/Q_i - b*S_i/Q_i^2, \text{ where} \quad (3)$$

J is the function that needs to be minimized and $R_i$ is the number of bits available for encoding the macroblock and $S_i$ is the signal energy, a and b are the constants that need to be determined to estimate the quantizer for a given signal. The estimated a and b values are used for estimating the bits consumed by the next macroblock. The error after encoding the next macroblock is used to update the coefficients a and b. The coefficients a and b are determined by the following equations:

$$a = \{\Sigma(R_i/S_i)*\Sigma(1/Q_i) - \Sigma(R_iQ_i/S_i)*\Sigma(1/Q_i^2)\}/\{\Sigma(1/Q_i^2) - N*\Sigma(1/Q_i^2)\} \quad (4)$$

$$b = \{\Sigma(R_iQ_i/S_i)*\Sigma(1/Q_i) - N\Sigma(R_i/S_i)\}/\{\Sigma(1/Q_i^2) - N*\Sigma(1/Q_i^2)\}, \quad (5)$$

where the summation extends over i=0 to i=N, where N is the number of macroblocks in the frame. The summation is carried out only for the coded I-macroblocks and not in case of P and B pictures which are excluded from the estimation of a and b. This ensures that the outliers or extreme points like the bits consumed by an uncoded macroblock does not upset the computation of a and b. The computed values of a, b and the signal energy are used in equation 1 above to compute the desired quantizer scale for the macroblock. In this computation of the quantizer scale, care is taken to ensure that roots of the equation 1 exist, and if otherwise, the first order model given below is used to compute the quantizer scale.

$$B_i = c*S_i/Q_i \quad (6)$$

where c is the estimated value which provides a best estimate for equation 6. Different values of a and b are used for I macroblocks and P (or B) macroblocks.

In further improvement to the rate control algorithm, the given bit rate, the frame rate and the number of macroblocks to be coded are considered for allocating bits per frame and consequently bits per macroblock. The allocation is done for a group of pictures called GOP such that the number of I-pictures in a group is the same. Also, the rate control algorithm can be fine-tuned such that the allocation of bits for I pictures can be different from P and B pictures. For example, the number of bits given to an I-frame can be 5 to 6 times higher than the bits provided for P and B pictures. Given the bits per second desired by the user and the ratio of I pictures to P pictures in a second, and the factor by which the bit allocation for I pictures is higher than P pictures, the bits available per frame are computed. For example, if the bit rate is assumed to be X bits/second and the frame rate is assumed to be F and the number of I pictures per second is M, and the factor is K, in one second as per the preferential allotment of bits, there would be M I pictures and (F−M) P pictures. The effective number of P pictures in one second is given as:

$$\text{Number of bits allocated for a } P \text{ picture } B = X/(M*K+(F-M)) \quad (7)$$

Using equation 7 and the picture resolution Width×Height (W×H) the number of macroblocks per frame can be computed as:

$$N = W*H/(16\times16) \quad (8)$$

From equations 7 and 8 the bits per macroblock is B/N for P macroblocks and K*B/N for I macroblocks. This quantity is used for allocating the quantizer for each macroblock in equation 1.

To ensure a more effective rate control strategy, an optional addition to the above mentioned algorithms may be performed. The effective VBV bit rate is computed per frame before encoding, and the variation in VBV buffer size is also used in adjusting the bits allocated per macroblock. A certain predefined buffer size is assumed to be available at the decoder. This buffer is modeled as a leaky bucket algorithm, i.e., the bits consumed by the encoder are added to the buffer after every frame encoded, and the bits consumed by the decoder are subtracted from the buffer after decoding every frame. When the buffer is above a certain maximum threshold, the next frame is dropped. In the case of P pictures, there is a provision in the rate control to model the bits consumed by the motion vectors. A frame level average is used to determine the bits consumed by the motion vectors, i.e., the motion vector bits consumed by the previous frame are used for allocating for a new frame. This has been found to provide a good estimate for the motion vector bits. For the initial P-frame, a predefined factor is used to allocate the bits. The factor used is the ratio of bits for the entire frame and the estimated motion vector bits. A ratio of 3 has been found to be very effective in estimating the motion vector bits. However, this factor/ratio is not a limitation and can be changed to suit certain special cases.

After a frame encodes the actual number of bits, both coefficients and motion vectors consumed by the encoder are subtracted from the bits reservoir and the remaining bits are re-distributed equally to the remaining P pictures. This ensures that the additional bits consumed by the encoded frames are re-distributed to (or subtracted from) all the frames in the Group of Pictures (GOP). Also when a frame drop is encountered, the next P picture bit allocation for the motion vectors is adjusted to have a higher value, i.e., the bits allocated are the motion vector bits consumed by the previous frame times a scale factor. This scale factor ensures that estimation for motion vector bits for the current frame takes into account the greater motion that has happened between the last coded frame and the current frame. A value of 1.5 is preferred for this scale factor, as an example. The use of a suitable scale factor ensures that the rate control model is valid even if the scene change is very prominent.

In a further modification to the rate control strategy, the quantizer value calculated per macroblock is constrained to vary slightly, compared to the quantizer scale of the previous macroblock. This is done to ensure that current macroblock quantizer scale has the differential quantizer scale, compared to the quantizer scale used in the previous macroblock, within the allowed range of values as per the MPEG-4 standard. In order to reduce the number of bits used for signaling a quantizer scale-change across macroblocks, the quantizer scale variations in the model are constrained. This is achieved by estimating the bits consumed by the current macroblock at the quantizer scale of a previous coded macroblock. If the difference in bits consumed is within a certain predefined range, then the new estimated quantizer is not used, and instead, the quantizer scale of a previous macroblock is used. This ensures that the bits used for signaling the quantizer scale will change, whereby the bits used by the quantity 'dbquant' (which is the difference between the current quantizer and the previous quantizer) in MPEG4, are minimal. This strategy also ensures that the achieved quality is uniform throughout the frame by using very few variations in the quantizer. To provide a good quality video, the a and b values in equation 1 above are reset at the beginning of every frame and the average quantizer value of the previous frame is used for the first few macroblocks, and the resulting error in estimation is used to determine the values of a and b.

To further ensure that the quality of video is good, the rate control algorithm may be designed to change the GOP structure dynamically to suit the scene changes such that a scene change is coded as an Intra frame and a new GOP is assumed to begin from that frame. This ensures that the scene changes are handled without any abrupt loss in quality.

Figure 2:
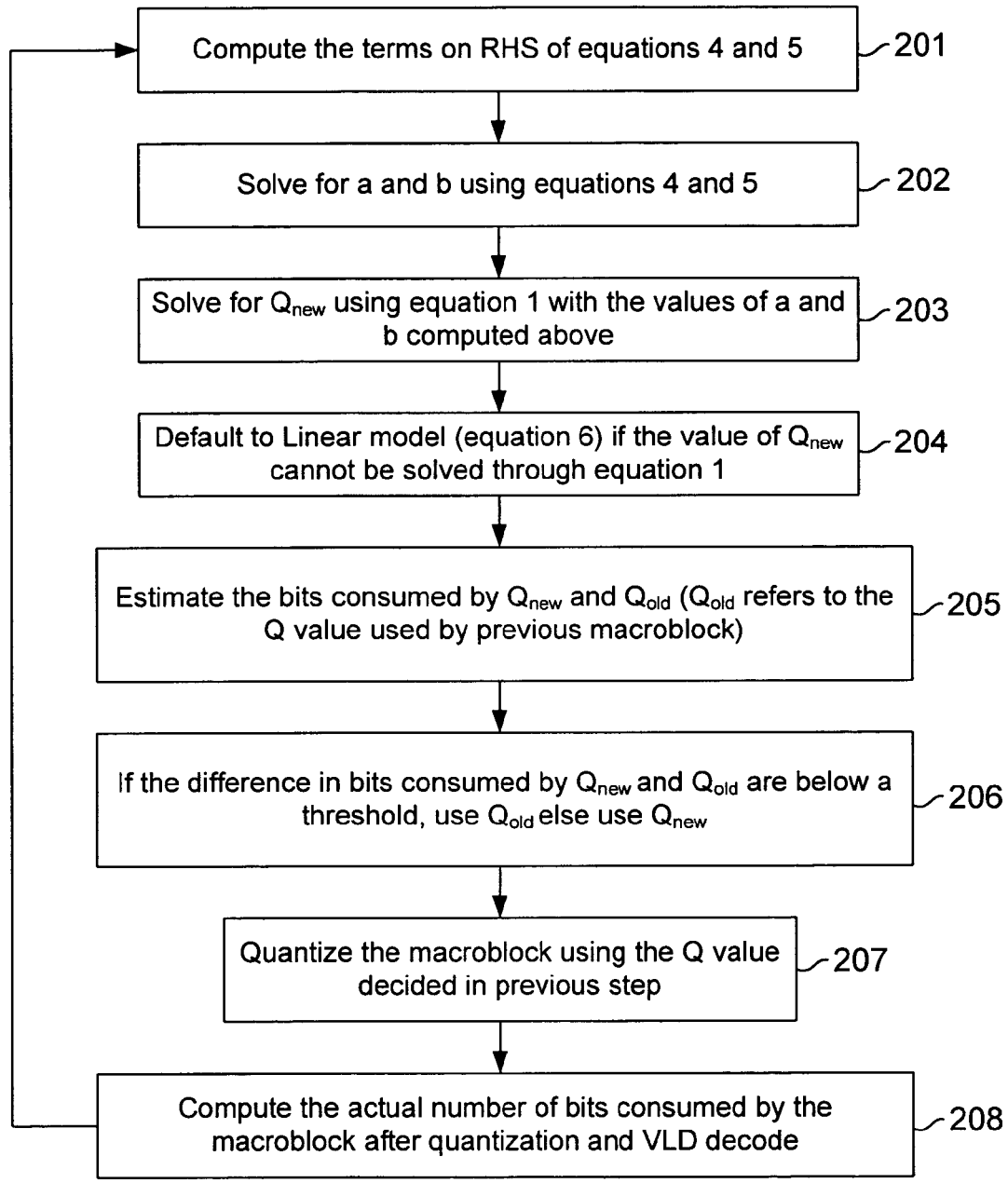
FIG. 2 illustrates an exemplary flow diagram for a bit rate control module; and, FIG. 3 illustrates a general purpose computing platform that can be used in implementing the invention.

FIG. 2 illustrates an exemplary flow diagram for the bit rate control module taught herein. After computing the terms on the RHS of the equations 4 and 5 in step 201, the model solves for the values of a and b using equations 4 and 5 at step 202. In step 203, the model solves for $Q_{new}$ using equation 1 with the values of a and b computed from step 202. In step 204, the quadratic model defaults to a linear model of the first order if the value of $Q_{new}$ cannot be solved using equation 1. In step 205, the bits consumed by $Q_{new}$ and $Q_{old}$ are estimated. In step 206 of the model, if the difference in the bits consumed by $Q_{new}$ and $Q_{old}$ is below a threshold, only $Q_{old}$ is used, or else, $Q_{new}$ is used. In step 207, the macroblock being coded is quantized using whichever value of Q is applicable. In step 208, the actual number of bits consumed by the macroblock after quantization and the VLD decoding is computed.

The foregoing is the description of an exemplary method for achieving bit rate controlled encoding, e.g., constant bit rate, using a bit rate control model based on bits allocated per macroblock and based on error in estimating bits consumed in an encoding process in a macroblock. The method computes bits consumed per macroblock using the bit rate control model, and allocates bits for the macroblock. The quadratic (second order) equation used for the model, might default into a first order equation requiring fewer computations, in the event that no second order solutions exist. As described above, in one form, the bit rate control model computes the bit rate to satisfy video buffer verifier (VBV) compliance in accordance with MPEG4 requirements. The bit rate control model makes allowances for different types of macroblock, i.e., inter (P frame), intra (I frame) or bidirectional (B frame), and provides for any frame-skips.

Figure 3:
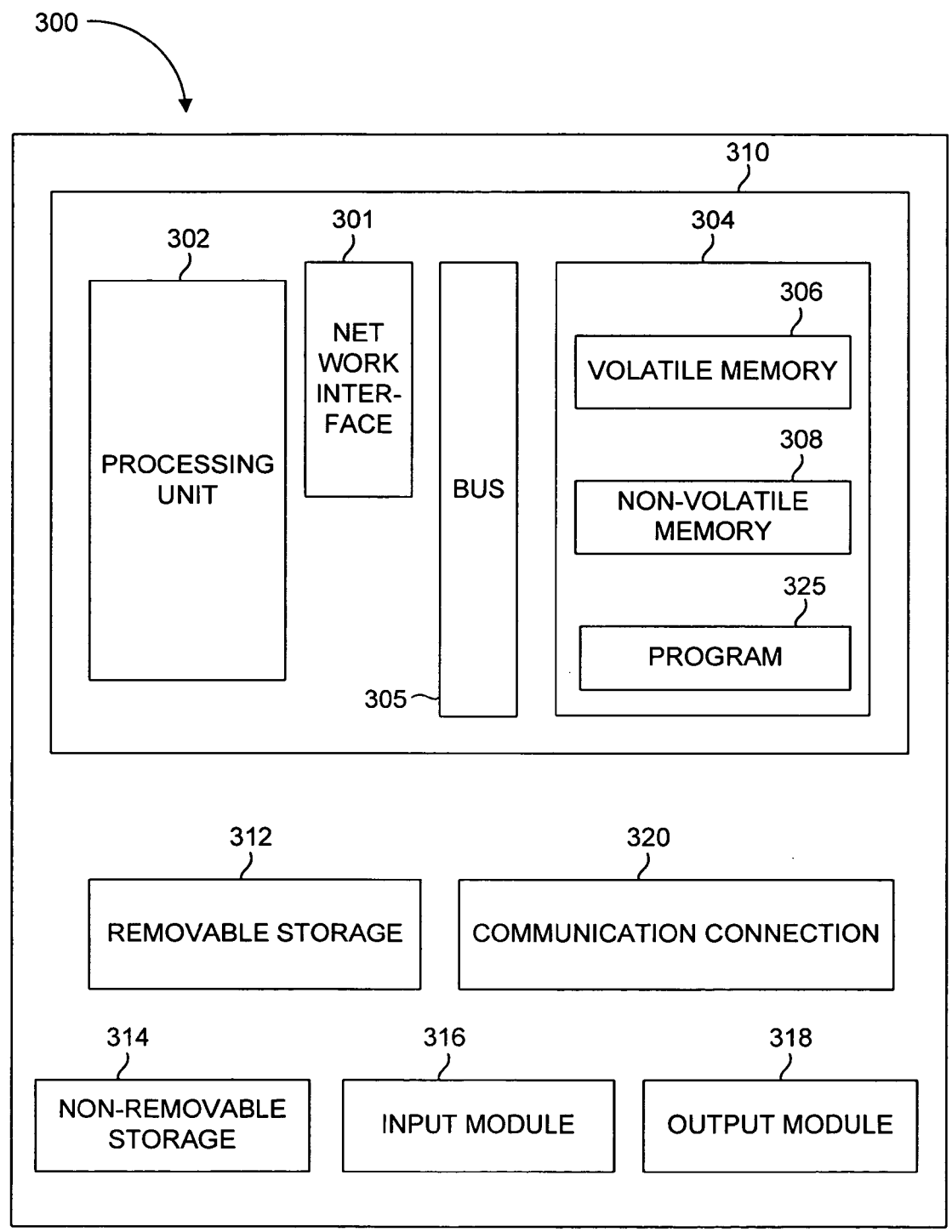

Various embodiments of the present subject matter can be implemented in software, which may be run in the environment shown in FIG. 3 or in any other suitable computing environment. The embodiments of the present subject matter are operable in a number of general-purpose or special-purpose computing environments. Some computing environments include personal computers, general-purpose computers, server computers, hand-held devices (including, but not limited to, telephones and personal digital assistants (PDAs) of all types), laptop devices, multi-processors, microprocessors, set-top boxes, programmable consumer electronics, network computers, minicomputers, mainframe computers, distributed computing environments and the like to execute code stored on a computer-readable medium. It is also noted that the embodiments of the present subject matter may be implemented in part or in whole as machine-executable instructions, such as program modules that are executed by a computer. Generally, program modules include routines, programs, objects, components, data structures, and the like to perform particular tasks or to implement particular abstract data types. In a distributed computing environment, the program modules may be located in local or remote storage devices.

FIG. 3 shows an example of a suitable computing system environment for implementing embodiments of the present subject matter. FIG. 3 and the following discussion are intended to provide a brief, general description of a suitable computing environment in which certain embodiments of the inventive concepts contained herein may be implemented.

A general computing device in the form of a computer 310 may include a processing unit 302, memory 304, removable storage 312, and non-removable storage 314. Computer 310 additionally includes a bus 305 and a network interface (NI) 301. Computer 310 may include or have access to a computing environment that includes one or more user input devices 316, one or more output modules or devices 318, and one or more communication connections 320 such as a network interface card or a USB connection. One or more user input devices 316 can be a touch screen and a stylus or the like. The one or more output devices 318 can be a display device of computer, computer monitor, TV screen, plasma display, LCD display, display on a touch screen, display on an electronic tablet, or the like. The computer 310 may operate in a networked environment using the communication connection 320 to connect to one or more remote computers. A remote computer may include a personal computer, server, router, network PC, a peer device or other network node, and/or the like. The communication connection may include a Local Area Network (LAN), a Wide Area Network (WAN), and/or other networks.

The memory 304 may include volatile memory 306 and non-volatile memory 308. A variety of computer-readable media may be stored in and accessed from the memory elements of computer 310, such as volatile memory 306 and non-volatile memory 308, removable storage 312 and non-removable storage 314. Computer memory elements can include any suitable memory device(s) for storing data and machine-readable instructions, such as read only memory (ROM), random access memory (RAM), erasable programmable read only memory (EPROM), electrically erasable programmable read only memory (EEPROM), hard drive, removable media drive for handling compact disks (CDs), digital video disks (DVDs), diskettes, magnetic tape cartridges, memory cards, Memory Sticks™, and the like, chemical storage, biological storage, and other types of data storage.

"Processor" or "processing unit" as used herein, means any type of computational circuit, such as, but not limited to a microprocessor, a microcontroller, a complex instruction set computing (CISC) microprocessor, a reduced instruction set computing (RISC) microprocessor, a very long instruction word (VLIW) microprocessor, explicitly parallel instruction computing (EPIC) microprocessor, a graphics processor, a digital signal processor, or any other type of processor or processing circuit. The term also includes embedded controllers, such as generic or programmable logic devices or arrays, application specific integrated circuits, single-chip computers, smart cards, and the like.

Embodiments of the present subject matter may be implemented in conjunction with program modules, including functions, procedures, data structures, application programs, etc., for performing tasks, or defining abstract data types or low-level hardware contexts.

Machine-readable instructions stored on any of the above-mentioned storage media are executable by the processing unit 302 of the computer 310. For example, a computer program 325 may include machine-readable instructions capable of providing a bit rate control model according to the teachings of the described embodiments of the present subject matter. In one embodiment, the computer program 325 may be included on a CD-ROM and loaded from the CD-ROM to a hard drive in non-volatile memory 308. The machine-readable instructions cause the computer 310 to decode according to the various embodiments of the present subject matter.

The foregoing is the description of exemplary implementations of the method and apparatus for achieving bit rate controlled encoding in motion estimation, for example, to achieve constant bit rate encoding. The above-described implementation is intended to be applicable, without limitation, to situations where bit allocation needs to be performed. The description hereinabove is intended to be illustrative, and not restrictive.

The various embodiments of the model described herein are applicable generally to any system involving bit-rate controlled encoding, and the embodiments described herein are in no way intended to limit the applicability of the invention. In addition, the techniques of the various exemplary embodiments are useful to the design of any hardware implementations of software, firmware, and algorithms in the context of bit rate controlling in general. Many other embodiments will be apparent to those skilled in the art. The scope of this invention should therefore be determined by the appended claims as supported by the text, along with the full scope of equivalents to which such claims are entitled.

The invention claimed is:

1. An article comprising a computer readable medium having instructions thereon which when executed by a computing platform result in execution of a method for computing a quantizer value (Q) in a video encoder, comprising:

modeling bits (B) required to code a current macroblock in a frame, in a rate control unit of the video encoder, using an equation $B=a*S/Q+b*S/Q^2$, where a and b are coefficients of the equation, S is signal energy of the current macroblock, and Q is the quantizer value used to code the current macroblock;

determining values of the coefficients a and b of the equation using a set of values of $R_i$, $S_i$, and $Q_i$ in the rate control unit, where $R_i$ is the actual number of bits consumed by an $i^{th}$ coded macroblock with signal energy ($S_i$) at a quantizer value ($Q_i$), and i varies from 0 to N−1, where N is a number of coded macroblocks in the frame up to the current macroblock; and, computing the quantizer value (Q) for the current macroblock, in the rate control unit, by solving the equation with the determined values of coefficients a and b, the signal energy (S) for the current macroblock, and the bits (B) allocated for the current macroblock.

2. A method for computing a quantizer value (Q) in a video encoder, comprising:

modeling bits (B) required to code a current macroblock in a frame, in a rate control unit of the video encoder, using an equation $B=a*S/Q+b*S/Q^2$, where a and b are coefficients of the equation, S is signal energy of the current macroblock, and Q is the quantizer value used to code the current macroblock;

determining values of the coefficients a and b of the equation using a set of values of $R_i$, $S_i$, and $Q_i$ in the rate control unit, where $R_i$ is the actual number of bits consumed by an $i^{th}$ coded macroblock with signal energy ($S_i$) at a quantizer value ($Q_i$), and i varies from 0 to N−1, where N is a number of coded macroblocks in the frame up to the current macroblock; and, computing the quantizer value (Q) for the current macroblock, in the rate control unit, by solving the equation with the determined values of coefficients a and b, the signal energy (S) for the current macroblock, and the bits (B) allocated for the current macroblock.

3. The method of claim 2, wherein the values of the coefficients a and b are determined using the equations:

$$a=\{\Sigma(R_i/S_i)*\Sigma(1/Q_i)-\Sigma(R_iQ_i/S_i)*\Sigma(1/Q^2_i)\}/\{\Sigma(1/Q^2_i)-N*\Sigma(1/Q^2_i)\}, \text{ and}$$

$$b=\{\Sigma(R_iQ_i/S_i)*\Sigma(1/Q_i)-N*\Sigma(R_i/S_i)\}/\{\Sigma(1/Q^2_i)-N*\Sigma(1/Q^2_i)\},$$

Wherein summation extends over i=0 to i=N−1, where N is the number of coded macroblocks in the frame up to the current macroblock.

4. The method of claim 2, wherein the bits (B) allocated for the current macroblock is computed using the equation:

bits allocated per macroblock=bits per frame/number of macroblocks.

5. The method of claim 4, wherein the bits per frame is computed based on bits per second desired by a user, a ratio of I pictures to P pictures in a second and a factor by which bit allocation for the I pictures is higher than for P pictures.

6. The method of claim 5, wherein the computed bits per frame is modified based on the video buffering verifier (VBV) requirement for the MPEG standards.

7. The method of claim 2, wherein the step of allocating the bits for the macroblock is computed using the equation:

bits allocated per macroblock=(bits in reservoir-actual bits consumed by the previous macroblock)/remaining number of macroblocks.

8. The method of claim 2 further comprising:

computing a difference in bits between the bits (B) used for computing the quantizer value (Q) of the current macroblock and bits estimated for the current macroblock at a quantizer value ($Q_{old}$) of the previous macroblock:

if the difference in bits is greater than or equal to a threshold value, then quantizing the current macroblock using the computed quantizer value (Q) of the current macroblock; and if the difference in bits is below the threshold value, then quantizing the current macroblock using the quantizer value ($Q_{old}$) of the previous macroblock.

9. The method of claim 2, wherein the step of computing a quantizer value further comprises:

if the computed quantizer value is not a real number, then degenerating the equation to an equation in Q, given by $$B=c*S/Q$$

where c is coefficient of the equation, S is the signal energy of the current macroblock, Q is the quantizer value used to code the current macroblock, and B is the bits required to code the current macroblock in the frame;

determining the coefficient c of the linear equation as a least squares estimate using the set of values of $R_i$, $S_i$, and $Q_i$, where $R_i$ is the actual number of bits consumed by the $i^{th}$ coded macroblock with signal energy ($S_i$) at a quantizer value ($Q_i$), and i varies from 0 to N−1, where N is the number of coded macroblocks in the frame up to the current macroblock; and, computing the quantizer value (Q) for the current macroblock by solving the linear equation with the determined value of coefficient c, the signal energy (S) for the current macroblock, and the bits (B) allocated for the current macroblock.

10. The method of claim 2, wherein the step of determining the values of the coefficients of the equation comprises:

determining values of model coefficients for intra and inter (or bi-directional) macroblocks separately.

11. The method of claim 10, wherein, for coding intra coded frames, signal energy is assumed to be a sum of all the pixel values in the current macroblock to be encoded.

12. The method of claim 10, wherein forming the model for an inter macroblock comprises: dividing the allocated bits per macroblock into bits for motion vector data and coefficient data.

13. The method of claim 12, wherein the bits for the motion vector data are computed by a predetermined ratio of the allocated bits per macroblock.

14. The method of claim 13, wherein the model is used for computing the quantizer value based on the allocated bits per coefficient data.

15. The method of claim 14, further comprising: scaling motion vector bits based on a number of frame-skips.

16. The method of claim 15, where, in case of P pictures, the method includes using frame level average to determine bits consumed by motion vectors, and using a predetermined factor of allocated bits per frame for allocating motion vector bits for an initial P frame.

17. The method of claim 2, wherein the allocation of bits per macroblock is done for a group of pictures (GOP).

18. The method of claim 17 further comprising changing a GOP structure dynamically to suit scene changes such that a scene change is coded as an Intra frame, and a new GOP begins from the Intra frame.

19. The method of claim 2 further comprising resetting the values of coefficients a and b at the beginning of every frame and the average quantizer value of the previous frame is used for the first few macroblocks, and resulting error in estimation is used to determine the values of a and b.

* * * * *